US011961481B2

(12) United States Patent
Kim et al.

(10) Patent No.: US 11,961,481 B2
(45) Date of Patent: Apr. 16, 2024

(54) INTEGRATED CIRCUIT FOR DRIVING PIXEL OF DISPLAY PANEL, PIXEL DRIVING DEVICE, AND PIXEL DEFECT DETECTING METHOD

(71) Applicant: LX Semicon Co., Ltd., Daejeon (KR)

(72) Inventors: Kyoung Tae Kim, Daejeon (KR); Dong Hwan Kim, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 17/954,997

(22) Filed: Sep. 28, 2022

(65) Prior Publication Data

US 2023/0116660 A1 Apr. 13, 2023

(30) Foreign Application Priority Data

Oct. 8, 2021 (KR) ........................ 10-2021-0134042

(51) Int. Cl.
*G09G 3/3291* (2016.01)
*G09G 3/3233* (2016.01)

(52) U.S. Cl.
CPC ......... *G09G 3/3291* (2013.01); *G09G 3/3233* (2013.01); *G09G 2310/0291* (2013.01); *G09G 2330/12* (2013.01)

(58) Field of Classification Search
CPC .... G09G 3/3291; G09G 3/3233; G09G 3/006; G01R 31/2635
See application file for complete search history.

(56) References Cited

U.S. PATENT DOCUMENTS

| | | | | |
|---|---|---|---|---|
| 8,558,463 | B2 | 10/2013 | Sato et al. | |
| 10,460,662 | B2 * | 10/2019 | Song | G09G 3/006 |
| 10,818,207 | B2 * | 10/2020 | Li | G09G 3/006 |
| 10,878,734 | B1 * | 12/2020 | Watsuda | G09G 3/3233 |
| 2008/0218451 | A1 * | 9/2008 | Miyamoto | G09G 3/3233 345/76 |
| 2013/0082603 | A1 | 4/2013 | Isu et al. | |
| 2017/0025061 | A1 * | 1/2017 | Takizawa | G09G 3/3291 |
| 2017/0047017 | A1 * | 2/2017 | Shirouzu | G09G 3/325 |

* cited by examiner

*Primary Examiner* — Sardis F Azongha
(74) *Attorney, Agent, or Firm* — ROTHWELL, FIGG, ERNST & MANBECK, P.C.

(57) ABSTRACT

The present disclosure relates to an integrated circuit, a pixel driving device and a pixel defect detecting method and provides a device and method to sense a voltage of a light emitting diode of a pixel through a data line and to compare the sensed voltage with a reference range, thereby determining a pixel defect.

19 Claims, 15 Drawing Sheets

INTEGRATED CIRCUIT FOR DRIVING PIXEL OF DISPLAY PANEL, PIXEL DRIVING DEVICE, AND PIXEL DEFECT DETECTING METHOD

CROSS REFERENCE TO RELATED APPLICATION

This application claims priority to Republic of Korea Patent Application No. 10-2021-0134042 filed on Oct. 8, 2021, which is hereby incorporated by reference in its entirety.

BACKGROUND

1. Field of Technology

The present disclosure relates to an integrated circuit for driving a pixel of a display panel, a pixel driving device, and a pixel defect detecting method.

2. Related Technology

With the progress of informatization, various display devices capable of visualizing information have been developed. Examples of the display devices which have been recently developed or are being developed include a liquid crystal display (LCD), organic light emitting diode (OLED) display device, plasma display panel (PDP) and the like. With the development of display technology, such display devices are designed to properly display high-resolution images.

However, although the above-described display devices can properly display high-resolution images, it is difficult to reduce the sizes of the display devices. For example, large-sized OLED display devices which have been developed until now only have a size of 80 inches (approximately 2 m) or 100 inches (approximately 25 m), and thus are not suitable for fabricating a large-sized display device having a horizontal length of 10 m or more.

Recently, much attention has been paid to a light emitting diode (LED) display device as a method for solving such a size problem. The LED display device may include a necessary number of modularized LED pixels, which are arranged to constitute one large-sized panel. Alternatively, the LED display device may include a necessary number of unit panels each having a plurality of LED pixels, which are arranged to form one large-sized panel structure. According to the LED display device technology, a necessary number of LED pixels may be expanded and arranged, which makes it easy to implement a large-sized display device.

The LED display device is advantageous to the diversification of panel sizes as well as the size enlargement. Thus, the horizontal and vertical lengths of the LED display device may be adjusted to various values according to a proper arrangement of LED pixels.

A display panel having LEDs arranged therein may be driven through a variety of methods. Representative examples of the driving method may include a pulse amplitude modulation (PAM) method and a pulse width modulation (PWM) method. The PAM method is to supply a pixel with an analog voltage corresponding to the grayscale value of the pixel, and control the magnitude of a current, flowing through the pixel, to a different value depending on the analog voltage, and the PWM method is to adjust the time during which a current is supplied to a pixel according to the grayscale value of the pixel.

The display panel may include a plurality of pixels. According to a current flowing through an LED included in each of the pixels, the LED may emit light to display a desired image.

However, when a defect occurs in the LED included in each of the pixels, the corresponding pixel cannot be normally displayed. In order to detect defects of the plurality of pixels, a plurality of defect detection circuits corresponding to the number of the pixels need to be added. Thus, the area of a display circuit is inevitably increased.

The discussions in this section are only to provide background information and does not constitute an admission of prior art.

SUMMARY

Under such a background, in one aspect, various embodiments are directed to providing an integrated circuit for driving a pixel of a display panel, in which a driving circuit for providing a data voltage to drive each pixel can sense a voltage (e.g. voltage of anode terminal or forward voltage drop) of a light emitting diode included in each pixel and detect a defect (e.g. open or short) of the pixel, and a pixel driving device and a pixel defect detecting method.

In one aspect, the present disclosure provides an integrated circuit comprising: a driving circuit configured to provide a data voltage to a pixel of a panel through a data line connected to the pixel, to sense a voltage of a light emitting diode of the pixel through the data line, and to compare the voltage of the light emitting diode with a reference voltage; and a detection circuit configured to receive, from the driving circuit, a comparison result between the voltage of the light emitting diode and the reference voltage and to identify a defect of the pixel on the basis of the received comparison result.

In another aspect, the present disclosure provides a pixel driving device comprising: an amplifier configured to provide a data voltage to a pixel through the data line connected with the pixel of a panel; and a first switch connected between the pixel and an output terminal of the amplifier, wherein, when the first switch is closed, the amplifier receives a source voltage through a first input terminal thereof and provides the data voltage to the pixel through the data line connected to an output terminal thereof and, when the first switch is open, the amplifier receives a reference voltage through the first input terminal thereof, receives the voltage of the light emitting diode included in the pixel sensed through the data line through a second input terminal thereof, and outputs a comparison result between the reference voltage and the voltage of the light emitting diode through the output terminal.

In still another aspect, the present disclosure provides a pixel defect detecting method for detecting a defect in a pixel of a display panel having a plurality of pixels arranged therein, the pixel defect detecting method comprising: providing a data voltage to the pixel by an amplifier connected with the pixel through a data line in a first time period; receiving, by the amplifier, a reference voltage and a voltage of a light emitting diode included in the pixel and outputting a comparison result between the reference voltage and the voltage of the light emitting diode in a second time period; and identifying a defect of the pixel on the basis of the comparison result between the reference voltage and the voltage of the light emitting diode.

According to the present embodiments, the driving circuit for providing a data voltage to drive each pixel may sense a voltage (e.g. voltage of anode terminal or forward voltage drop) of the light emitting diode included in each pixel and detect a defect (e.g. open or short) of the pixel. Thus, a separate comparator does not need to be added, in order to detect whether each pixel has a defect.

Furthermore, the amplifier included in the driving circuit which provides the data voltage for driving each pixel may be reused as a comparator for pixel defect determination, which makes it possible to reduce the area of the display circuit.

Furthermore, the display device simultaneously sense a plurality of pixels arranged in the same row, among a plurality of pixels arranged in the display panel, and determine whether each of the pixels have a defect, which makes it possible to minimize the pixel defect determination speed.

DETAILED DESCRIPTION OF EMBODIMENTS

Figure 1:
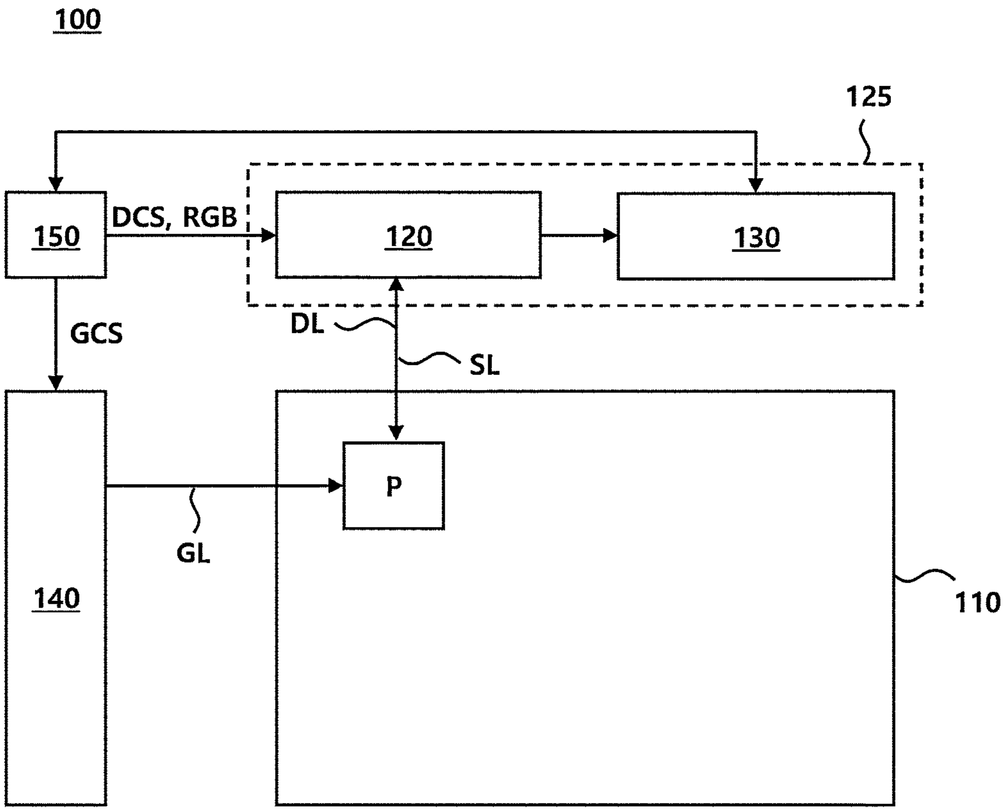
FIG. 1 is a configuration diagram of a display device in accordance with an embodiment.

FIG. 1 is a configuration diagram of a display device in accordance with an embodiment.

Referring to FIG. 1, a display device 100 may include a panel (or display panel) 110 and a panel driving circuit (or driving circuit) for driving the panel 110. The panel driving circuit may include a data driving circuit 120, a gate driving circuit 140 and a data processing circuit 150. The display device 100 may further include a detection circuit 130.

The panel 110 may include a plurality of data lines DL, a plurality of gate lines GL and a plurality of pixels P (or sub-pixels SP), which are arranged therein. In an embodiment, at least some of the plurality of data lines DL and the plurality of gate lines GL may be used as a plurality of sensing lines SL.

The circuits 120, 140 and 150 for driving one or more components included in the panel 110 may be referred to as panel driving circuits or driving circuits. For example, at least one of the data driving circuit 120, the gate driving circuit 140 and the data processing circuit 150 may be each referred to as a panel driving circuit or a driving circuit. The above-described circuits 120, 140 and 150 may be each referred to as a panel driving circuit or driving circuit, and the entire circuits or a plurality of circuits may be referred to as panel driving circuits or driving circuits.

In the panel driving circuit, the gate driving circuit 140 may supply a scan signal having a turn-on voltage or turn-off voltage to each of the pixels P through the corresponding gate line GL. When the scan signal having the turn-on voltage is supplied to each of the pixels P, the corresponding pixel P is connected to the data line DL. When the scan signal having the turn-off voltage is supplied to each of the pixels P, the corresponding pixel P is disconnected from the data line DL.

In the panel driving circuit, the data driving circuit 120 supplies a data voltage to the data line DL. The data voltage supplied to the data line DL, which is, for example, a voltage corresponding to a grayscale value of each pixel, may be transferred to the pixel P connected to the data line DL according to the scan signal.

In an embodiment, the data driving circuit 120 may use at least some of the data lines DL as the sensing lines SL. For example, the data driving circuit 120 may sense a voltage of a light emitting diode (e.g. LED) within a pixel P through the data line DL, which is to supply a data voltage to each pixel P. Here, the voltage may be a forward drop voltage measured at an anode end of the light emitting diode. When the display device 100 operates in a first mode (e.g. display driving mode) in the first time period, the data driving circuit 120 may supply a data voltage to each of the pixels P through the data line DL. When the display device 100 operates in a second mode (e.g. pixel defect detecting mode) in the second time period, the data driving circuit 120 may sense a voltage of the light emitting diode (e.g. LED) within the pixel P by using the data line DL as the sensing line SL. When the display device 100 operates in the second mode (e.g. pixel defect detecting mode), the data driving circuit 120 may detect a defect (e.g. open or short) of the pixel P by comparing the voltage of the light emitting diode within the pixel P (for example, a forward drop voltage measured at an anode end of the light emitting diode), which is sensed through the data line DL, with at least one reference voltage.

For example, when the display device 100 operates in the second mode (e.g. pixel defect detecting mode), the data driving circuit 120 may compare the voltage of the light emitting diode within the pixel P (for example, a forward drop voltage measured at an anode end of the light emitting diode) and sensed through the data line DL, to a first reference voltage, and transmit the comparison result to the detection circuit 130. The detection circuit 130 may identify (or determine) whether the light emitting diode included in the pixel P is open based on the comparison result.

When the display device 100 operates in the second mode (e.g. pixel defect detecting mode), the data driving circuit 120 may compare the voltage of the light emitting diode within the pixel P (for example, a forward drop voltage measured at an anode end of the light emitting diode) and sensed through the data line DL, to a second reference voltage, and transmit the comparison result to the detection circuit 130. The detection circuit 130 may identify (or determine) whether the LED included in the pixel P is shorted based on the comparison result. An operation method in detail of the pixel defect detecting operation of the data driving circuit 120 and the detection circuit 130 will be described below in detail with reference to FIG. 4 and the following drawings.

In the panel driving circuit, the data processing circuit 150 may supply various control signals to one or more of the data driving circuit 120, the detection circuit 130 and the gate driving circuit 140. The data processing circuit 150 may generate a gate control signal GCS for controlling the start of a scan according to a timing implemented in each frame, and transmit the generated gate control signal GCS to the gate driving circuit 140. The data processing circuit 150 may convert image data inputted from outside into image data RGB suitable for a data signal format used in the data driving circuit 120, and output the image data RGB to the data driving circuit 120. Furthermore, the data processing circuit 150 may transmit a data control signal DCS for controlling the data driving circuit 120 to supply a data voltage to each of the pixels P according to each timing.

The data driving circuit 120 may be referred to as a source driving. The gate driving circuit 140 may be referred to as a gate driving. The data processing circuit 150 may be referred to as a timing controller T-CON or a controller. The data driving circuit 120 and the detection circuit 130 may be included in one integrated circuit 125, and referred to as a source driving integrated circuit (IC). Furthermore, the data driving circuit 120, the detection circuit 130 and the data processing circuit 150 may be included in one integrated circuit, and referred to as an IC. The present embodiment is not limited to such names. In the following descriptions, however, the descriptions of some generally known components in the source driving, the gate driving and the timing controller will be omitted herein. Thus, for understandings of the embodiment, it should be considered that such some components are omitted.

The panel (or display panel) 110 may be an LED panel. At this time, the pixels P (or sub-pixels SP) arranged in the panel 110 may include an LED and one or more transistors. The panel (or display panel) 110 may be an OLED panel. At this time, the pixels P arranged in the panel 110 may include an OLED and one or more transistors. The LED or OLED included in each of the pixels P may be damaged with the use of the display device. For example, when the LED or OLED included in each of the pixels P is open or shorted, the LED or OLED may not normally emit light even though a preset normal current flows therethrough. In an embodiment, the data driving circuit 120 may sense a forward voltage drop of the light emitting diode (e.g. the LED or OLED) included in each of the pixels P, for example, the voltage at the anode terminal of the light emitting diode, and compare the sensed forward voltage drop to one or more reference voltages, thereby detecting a defect of the light emitting diode. In the following embodiments, the case in which the light emitting diode is an LED will be taken as an example, for convenience of description. However, the present embodiments are not limited thereto.

Figure 2:
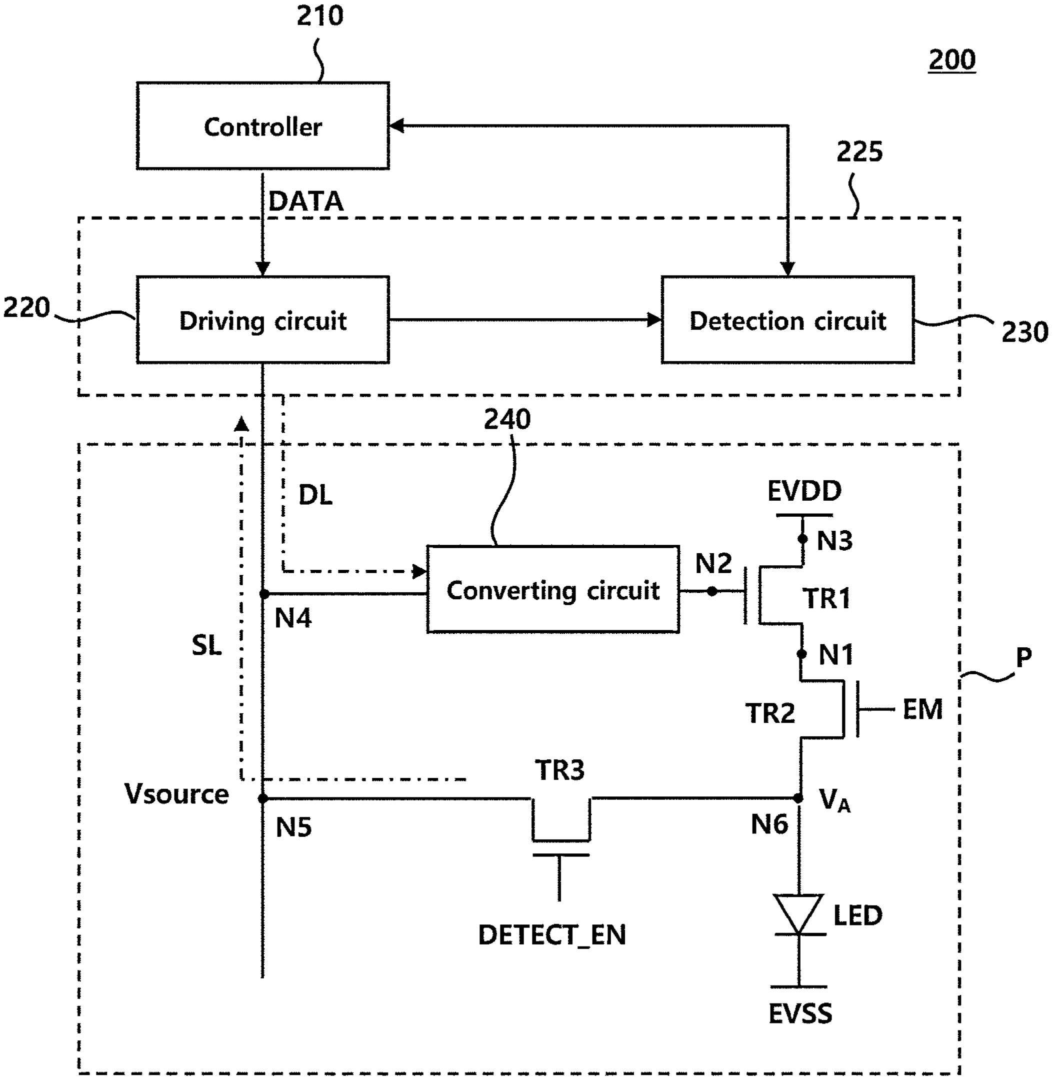
FIG. 2 is a detailed configuration diagram of a display device in accordance with an embodiment.

FIG. 2 is a detailed configuration diagram of a display device in accordance with an embodiment.

Referring to FIG. 2, a display device 200 may include a controller 210, a driving circuit 220, a detection circuit 230, and a plurality of pixels P arranged in a display panel. The controller 210 may perform at least some functions or the entire functions of the data processing circuit 150 of FIG. 1, and control a pixel defect detecting operation in accordance with an embodiment which will be described below. The driving circuit 220 may include the data driving circuit 120 of FIG. 1, and further include the gate driving circuit 140 of FIG. 1. The detection circuit 230 may include the detection circuit 130 of FIG. 1. The driving circuit 220 and the detection circuit 230 may be included in one IC 225, and referred to as a source driving IC. Furthermore, the driving circuit 220, the detection circuit 230 and the controller 210 may be included in one IC, and referred to as an IC.

The pixel P may include a converting circuit 240, a light emitting diode (e.g. LED or OLED), a first transistor TR1 (e.g. driving transistor), a second transistor TR2 (e.g. light emitting control transistor) and a third transistor TR3 (e.g. detection control transistor). In the following descriptions, an LED will be taken as an example of the light emitting diode, for convenience of description. However, the LED may be replaced with various types of different light emitting diodes including an OLED. The pixel P may be formed in a silicon back plane, and the transistors TR1 to TR3 arranged in the pixel P may be formed in a complementary metal-oxide-silicon (CMOS) type.

The LED may be composed of an anode electrode, an organic layer, a cathode electrode and the like. The LED emits light while the anode electrode is connected to a driving voltage EVDD (or driving high voltage) and the cathode electrode is connected to a ground voltage EVSS (or driving low voltage), under control of the first transistor TR1 and/or the second transistor TR2.

Figure 3:
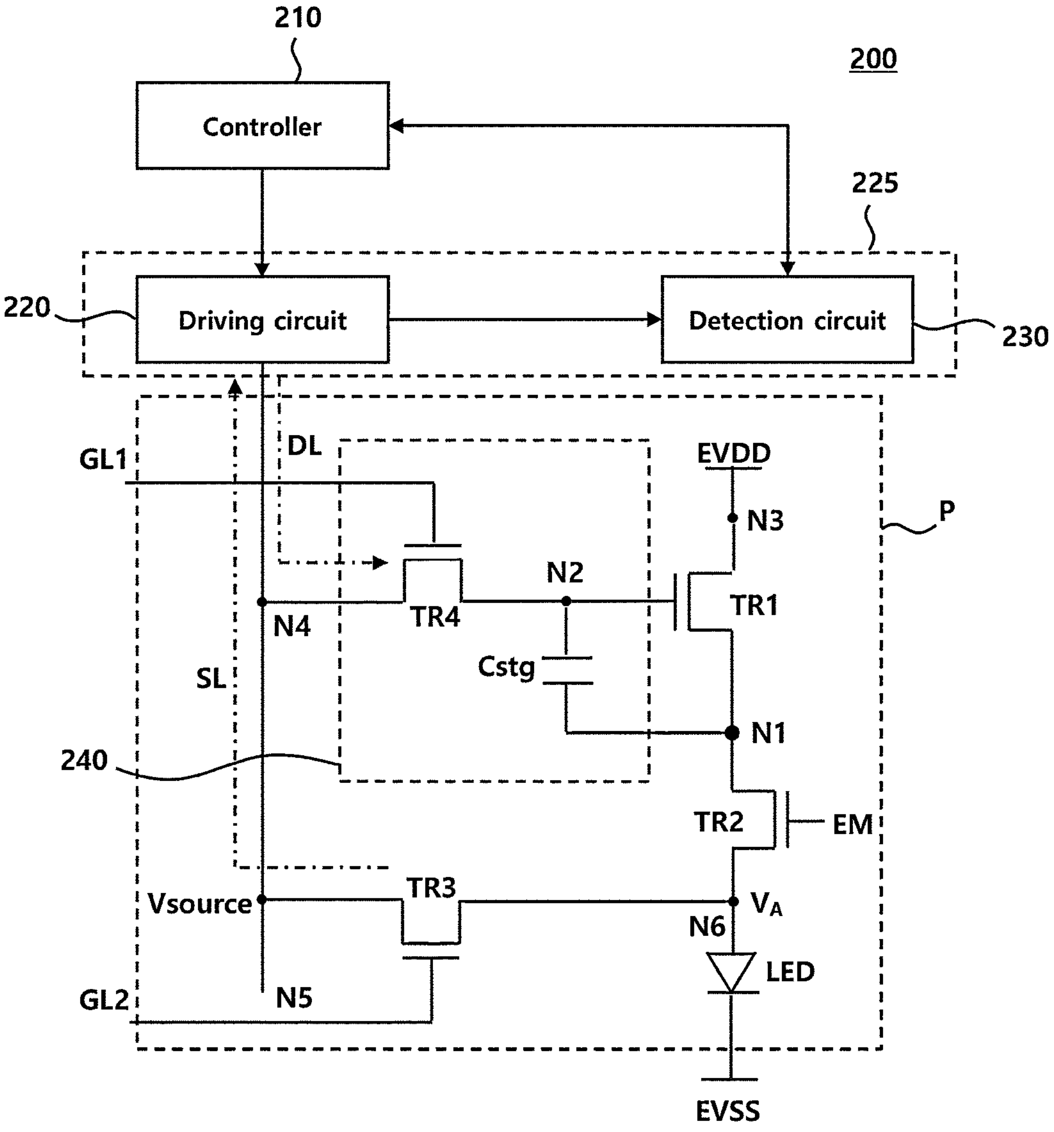
FIG. 3 is a detailed configuration diagram of a display device in accordance with an embodiment.

The first transistor TR1 may control the brightness of the LED by controlling a driving current supplied to the LED. A first node N1 of the first transistor TR1 may be electrically connected to the anode electrode of the LED through the second transistor TR2, and serve as a source or drain node. A second node N2 of the first transistor TR1 may be connected to the converting circuit 240. A third node N3 of the first transistor TR1 may be electrically connected to a driving voltage line DVL for supplying the driving voltage EVDD, and serve as a drain or source node. The converting circuit 240 may be electrically connected between the driving circuit 220 and the second node N2 of the first transistor TR1, and the first transistor TR1 may be turned on or off according to an output of the converting circuit 240. As illustrated in FIG. 3 which will be described below, the converting circuit 240 may include one or more transistors and one or more capacitors, receive a data voltage from the driving circuit 220, and convert the received data voltage through the PWM or PAM method. In an embodiment, lines through which the data voltage from the driving circuit 220 is supplied to the converting circuit 240 may be referred to as data lines DL. In an embodiment, at least some of the data lines DL may be used also as sensing lines SL as will be described below.

In an embodiment, when the display device 200 operates in a first mode (e.g. display driving mode) in a first time period, the driving circuit 220 may supply the data voltage to the converting circuit 240 through the data line DL. As described above, the converting circuit 240 may turn on the first transistor TR1 to pass a current through the LED, thereby causing the LED to emit light.

When the display device 200 operates in a second mode (e.g. pixel defect detecting mode) in a second time period, the driving circuit 220 may sense a voltage of the LED within the pixel P (for example, a voltage $V_A$ applied to an anode end of the LED, such as a forward drop voltage) by using at least some of the data lines DL as the sensing lines SL. For example, the driving circuit 220 may share and use a line between the driving circuit 220 and a fourth node N4 as the sensing line SL.

In an embodiment, when the display device 200 operates in the second mode (e.g. pixel defect detecting mode), the driving circuit 220 may turn on the third transistor TR3 according to a detection control signal DETECT_EN, and thus sense a voltage of the LED from a sixth node N6, for example, a voltage $V_A$ applied to the anode terminal of the LED (e.g. forward voltage drop). More specifically, when the third transistor TR3 is turned on by the detection control signal DETECT_EN while the display device 200 operates in the second mode (e.g. pixel defect detecting mode), the voltage $V_A$ applied to the anode terminal of the LED may correspond to a voltage VSOURCE applied to a fifth node N5 between the driving circuit 220 and the third transistor TR3. The driving circuit 220 may check the voltage $V_A$ of the sixth node N6 by sensing the voltage of the fifth node N5.

In an embodiment, the driving circuit 220 may compare the voltage of the LED (for example, a voltage $V_A$ applied to an anode end of the LED, such as a forward drop voltage) and sensed through at least some of the data lines DL, to one or more reference voltages, thereby detecting a defect of the LED. For example, when the display device 200 operates in the second mode (e.g. pixel defect detecting mode), the driving circuit 220 may compare the voltage of the LED and sensed through at least some of the data line DL, to a first reference voltage, and transmit the comparison result to the detection circuit 230. The detection circuit 230 may identify (or determine) whether the LED included in the pixel P is open, based on the comparison result with the first reference voltage.

When the display device 200 operates in the second mode (e.g. pixel defect detecting mode), the driving circuit 220 may compare the voltage $V_A$, of the LED and sensed through at least some of the data lines DL, to a second reference voltage, and transmit the comparison result to the detection circuit 230. The detection circuit 230 may determine whether the LED included in the pixel P is shorted, based on the comparison result with the second reference voltage. The pixel defect detecting operation of the driving circuit 220 and the detection circuit 230 will be described below in detail with reference to FIG. 4 and the following drawings.

FIG. 3 is a detailed configuration diagram of the display device in accordance with an embodiment. Referring to FIG. 3, the converting circuit 240 of FIG. 2 may include one transistor and one capacitor. However, this is only an example, and the converting circuit 240 is not limited to the example of FIG. 3. In an embodiment, the display device 200 including the converting circuit 240 may operate according to an active matrix method.

In an embodiment, the converting circuit 240 may include a fourth transistor TR4 and a storage capacitor Cstg, but is not limited thereto. The first transistor TR1 may control the brightness of the LED by controlling a driving current supplied to the LED. The first node N1 of the first transistor TR1 may be electrically connected to the anode electrode of the LED through the second transistor TR2, and serve as a source or drain node. The second node N2 of the first transistor TR1 may be electrically connected to a source or drain node of the fourth transistor TR4 (e.g. switching transistor SWT) of the converting circuit 240, and serve as a gate node. The third node N3 of the first transistor TR1 may be electrically connected to a driving voltage line DVL for supplying the driving voltage EVDD, and serve as a drain or source node.

The fourth transistor TR4 of the converting circuit 240 may be electrically connected between the data line DL and the second node N2 of the first transistor TR1, and turned on by a scan signal received through a gate line GL1. When the fourth transistor TR4 is turned on, a data voltage Vdata supplied from the driving circuit 220 through the data line DL may be transferred to the second node N2 of the first transistor TR1.

The storage capacitor Cstg may be electrically connected between the first and second nodes N1 and N2 of the first transistor TR1. The storage capacitor Cstg may be a parasitic capacitor existing between the first and second nodes N1 and N2 of the first transistor TR1, or an external capacitor which is intentionally designed outside the first transistor TR1.

The third transistor TR3 may connect the sixth node N6 and the sensing line SL. As the third transistor TR3 is turned on by the detection control signal DETECT_EN supplied through a gate line GL2, the voltage $V_A$ formed in the anode electrode of the LED may be sensed by the driving circuit 220.

In an embodiment, the driving circuit 220 may compare the voltage $V_A$, formed in the anode electrode of the LED and sensed through at least some of the data lines DL, to one or more reference voltages, thereby detecting a defect of the LED.

For example, when the display device 200 operates in the second mode (e.g. pixel defect detecting mode), the driving circuit 220 may compare the voltage $V_A$ of the LED (for example, a voltage $V_A$ applied to an anode end of the LED, such as a forward drop voltage) and sensed through at least some of the data lines DL, to the first reference voltage, and transmit the comparison result to the detection circuit 230. The detection circuit 230 may identify (or determine) whether the LED included in the pixel P is open, based on the comparison result.

When the display device 200 operates in the second mode (e.g. pixel defect detecting mode), the driving circuit 220 may compare the voltage $V_A$ of the LED (for example, a voltage $V_A$ applied to an anode end of the LED, such as a forward drop voltage) and sensed through at least some of the data lines DL, to the second reference voltage, and transmit the comparison result to the detection circuit 230. The detection circuit 230 may identify (or determine) whether the LED included in the pixel P is shorted, based on the comparison result. The pixel defect detecting operation of the driving circuit 220 and the detection circuit 230 will be described below in detail with reference to FIG. 4 and the following drawings.

In an embodiment, the above-described display device 100 may operate in the display driving mode (for example, in the first mode) in the first time period and operate in the pixel defect detecting mode (for example, in the second mode) in the second time period. The operation periods of the first mode and the second mode may be divided as shown in Table 1 below.

TABLE 1

| Operation mode | Operation period | | | | |
|---|---|---|---|---|---|
| First mode (Display driving mode) | Initialization period | Programming period | Light emitting period | | Reset period |
| Second mode (Pixel defect detecting mode) | Initialization period | Programming period | Comparison period | Logic processing period | Reset period |

Referring to Table 1, the operation period of the display device 100 or 200 in the first mode (e.g. display driving mode) may be divided into an initialization period, a programming period, a light emission period and a reset period. The operation period of the display device 100 or 200 in the second mode (e.g. pixel defect detecting mode) may be divided into an initialization period, a programming period, a comparison period, a logic processing period and a reset period. The programming period may be referred to as a precharge period. An operation in the reset period may be the same as or similar to that in the initialization period. An operation in the initialization period of the first mode may be the same as or similar to that in the initialization period of the second mode. An operation in the programming period of the first mode may be the same as or similar to that in the programming period of the second mode. An operation in the reset period of the first mode may be the same as or similar to that in the reset period of the second mode. The operations in the first mode may be the same as or similar to operations of a general display device in the display driving mode, and conducted according to the method described with reference to FIGS. 1 to 3. Hereafter, the situation in which the display device 100 or 200 operates in the second mode (e.g. pixel defect detecting mode) will be described with reference to FIGS. 4 to 6. Among the operations in the second mode, an operation of FIG. 4 may correspond to the initialization period, an operation of FIG. 5 may correspond to the programming period, and an operation of FIG. 6 may correspond to the comparison period and/or the logic processing period.

Figure 4:
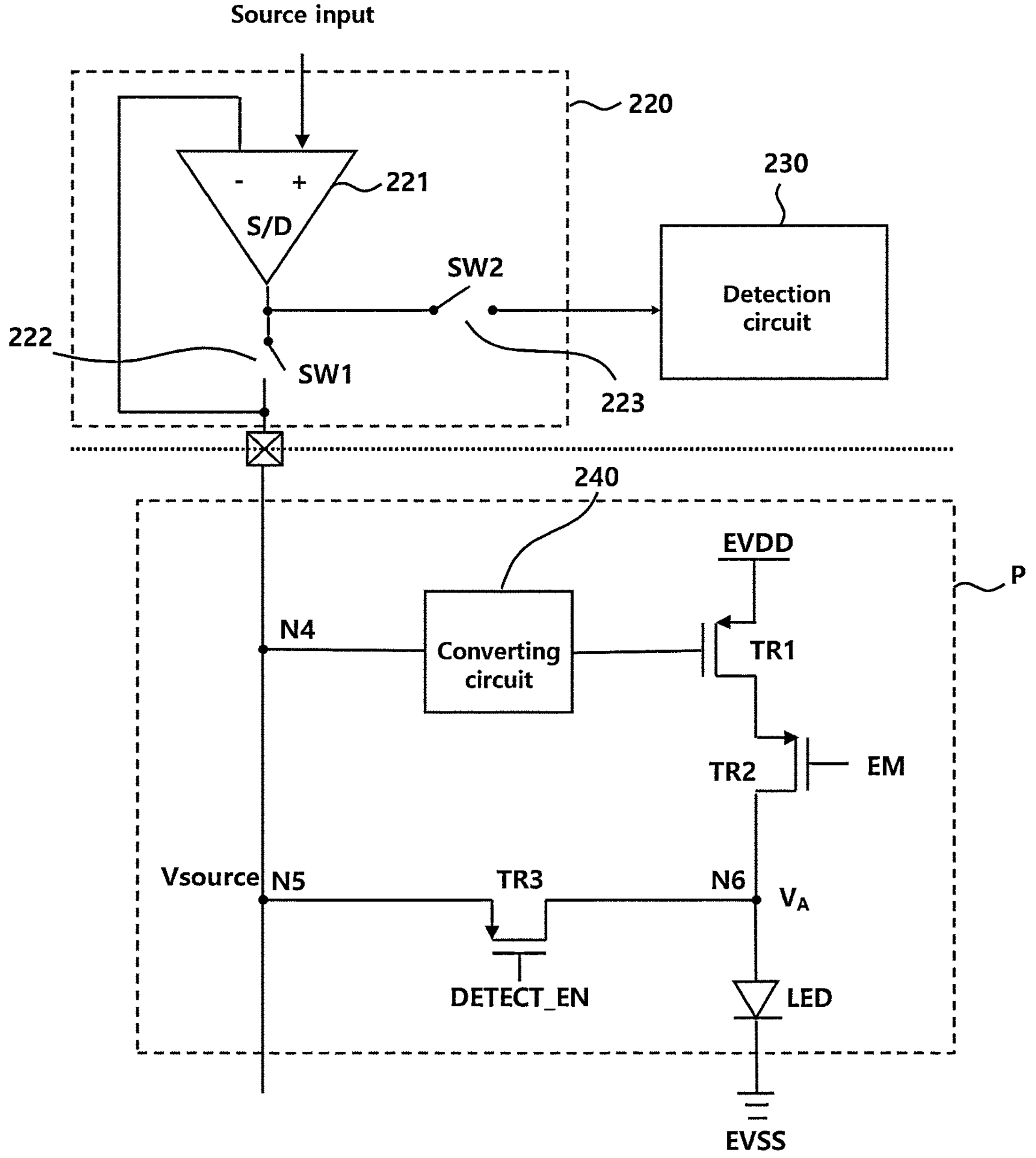
FIG. 4 is a diagram illustrating operations of circuits in an initialization period in accordance with an embodiment.
Figure 5:
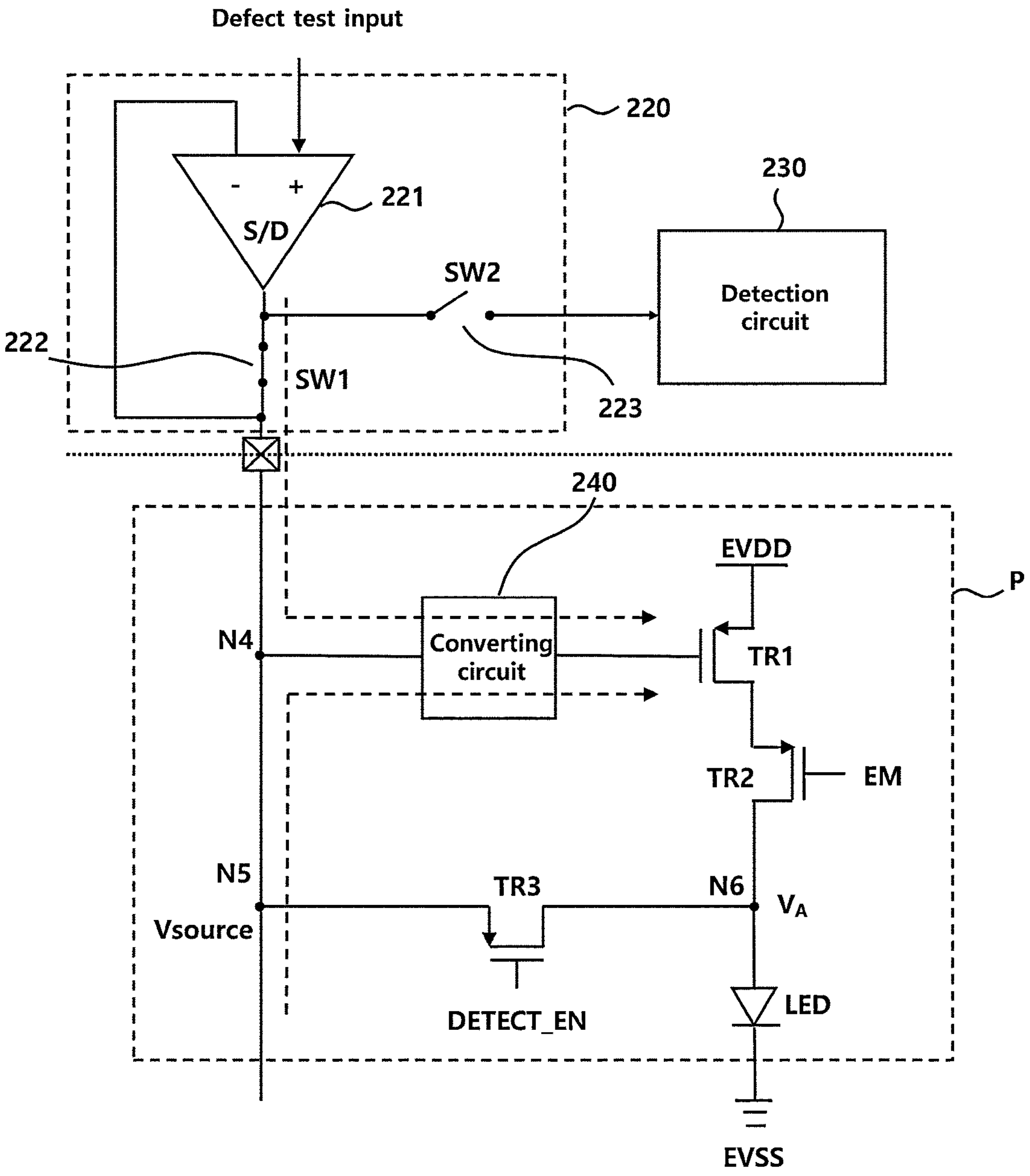
FIG. 5 is a diagram illustrating operations of the circuits in a programming period in accordance with an embodiment.
Figure 6:
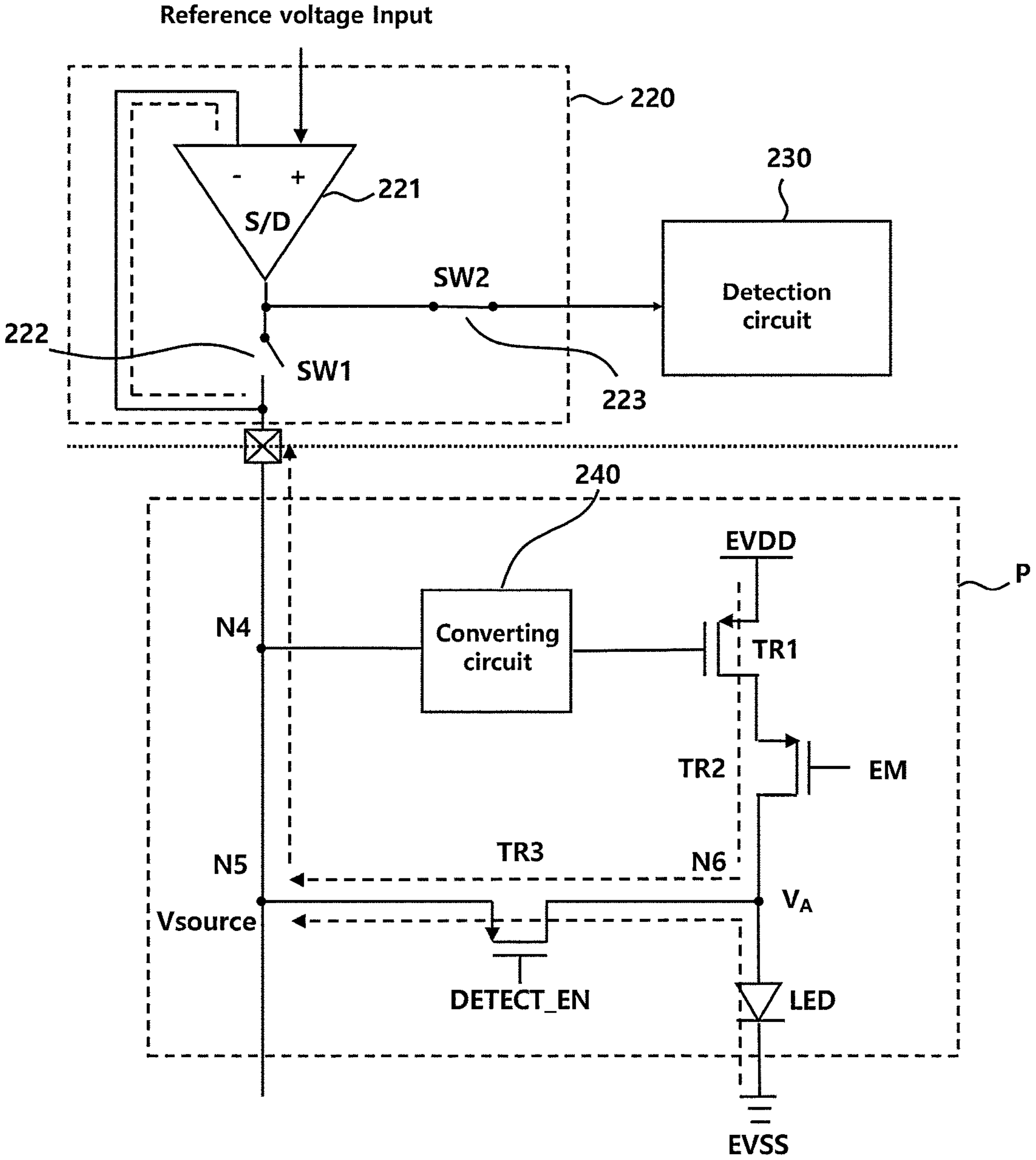
FIG. 6 is a diagram illustrating operations of the circuits in a comparison period in accordance with an embodiment.

In an embodiment, the driving circuit 220 illustrated in FIGS. 4 to 6 may include an amplifier 221 (e.g. a source amplifier or an output buffer), a first switch (SW1) 222 and a second switch (SW2) 223. However, the driving circuit 220 is not limited thereto. The first switch 222 may be located on the data line DL at an output terminal of the amplifier 221. The second switch 223 may be connected to the detection circuit 230 at the output terminal of the amplifier 221. The first switch 222 or the second switch 223 may be implemented by a switching element. Here, a switching element may comprise various types of transistors such as a filed effect transistor (FET) or a bipolar junction transistor (BJT). However, embodiments described below are not limited thereto.

The switch between open and close states of the first switch 222 and/or the second switch 223 may be performed under control of the controller 210. In an embodiment, the amplifier 221 may operate as an output buffer in the first mode (e.g. display driving mode), and operate as a comparator in the second mode (e.g. pixel defect detecting mode). When the amplifier 221 operates as an output buffer, the amplifier 221 may output a voltage having a level identical or similar to that of an input voltage (for example, a data voltage corresponding to a grayscale value of each pixel). In the following descriptions, a positive (+) terminal (for example, a non-inverting terminal) of the amplifier 221 will be referred to as a first input terminal, and a negative (−) terminal (for example, an inverting terminal) of the amplifier 221 will be referred to as a second input terminal. However, the preset embodiment is not limited thereto. In an embodiment, when the first and second input terminals are set in the opposite way, a result of the amplifier 221 may be processed as the opposite result of that in the following descriptions.

FIG. 4 is a diagram illustrating an operation of the circuit in the initialization period in accordance with an embodiment. Referring to FIG. 4, the first and second switches 222 and 223 included in the driving circuit 220 may be controlled to be open in the initialization period. In the initialization period, the first to third transistors TR1 to TR3 may be turned off. As the switches and the transistors are controlled to be open or turned off in the initialization period, the nodes and the capacitor (e.g. the storage capacitor Cstg of FIG. 3) which are included in the pixel P of the display device may be reset and initialized.

FIG. 5 is a diagram illustrating an operation of the circuit in the programming period in accordance with an embodiment. Referring to FIG. 5, the first switch 222 of the driving circuit 220 may be switched from the open state to the closed state in the programming period. In the programming period, a test voltage for pixel defect detection may be inputted to the first input terminal of the amplifier 221. The amplifier 221 may operate as an output buffer in the programming period, and a current corresponding to the test voltage inputted to the first input terminal of the amplifier 221 may be supplied to the converting circuit 240 through the output terminal of the amplifier 221. In the programming period, the transistor (e.g. fourth transistor TR4) within the converting circuit 240 may be turned on, and the current inputted to the converting circuit 240 may be stored in the capacitor (e.g. storage capacitor Cstg) within the converting circuit 240.

FIG. 6 is a diagram illustrating an operation of the circuit in the comparison period in accordance with an embodiment. Referring to FIG. 6, the first switch 222 of the driving circuit 220 may be switched from the closed state to the open state in the comparison period. In the comparison period, the second switch 223 of the driving circuit 220 may be switched from the open state to the closed state.

In the comparison period, the second and third transistors TR2 and TR3 may be turned on. As the second and third transistors TR2 and TR3 are turned on in the comparison period, the voltage $V_A$ at the anode terminal (e.g. the sixth node N6) of the LED may be sensed by the driving circuit 220. For example, when the third transistor TR3 is turned on, the sixth node N6 corresponding to the anode terminal of the LED may be connected to the fifth node N5 through the third transistor TR3, and the fifth node N5 may be connected to the data line DL at the fourth node N4. The voltage $V_A$ of the anode terminal (e.g. the sixth node N6) of the LED may be inputted to the second input terminal of the amplifier 221 through a feedback line of the driving circuit 220.

In the comparison period, one or more reference voltages (e.g. first reference voltage or second reference voltage) may be inputted to the first input terminal of the amplifier 221. For example, the amplifier 221 of the driving circuit 220 may compare the first reference voltage inputted to the first input terminal to the sensing voltage VSOURCE of the LED, inputted to the second input terminal, and transmit the comparison result to the detection circuit 230 through the second switch 223. The detection circuit 230 may determine whether the LED included in the pixel P is open, based on the comparison result. For example, when the comparison result indicates that the sensing voltage of the LED is larger than the first reference voltage, the detection circuit 230 may identify (or determine) that the LED is open.

Furthermore, the amplifier 221 of the driving circuit 220 may compare the second reference voltage inputted to the first input terminal to the sensing voltage VSOURCE of the LED inputted to the second input terminal, and transmit the comparison result to the detection circuit 230 through the second switch 223. The detection circuit 230 may determine whether the LED included in the pixel P is shorted, on the basis of the comparison result. For example, when the comparison result indicates that the sensing voltage of the LED is smaller than the second reference voltage, the detection circuit 230 may identify (or determine) that the LED is shorted.

Figure 7A:
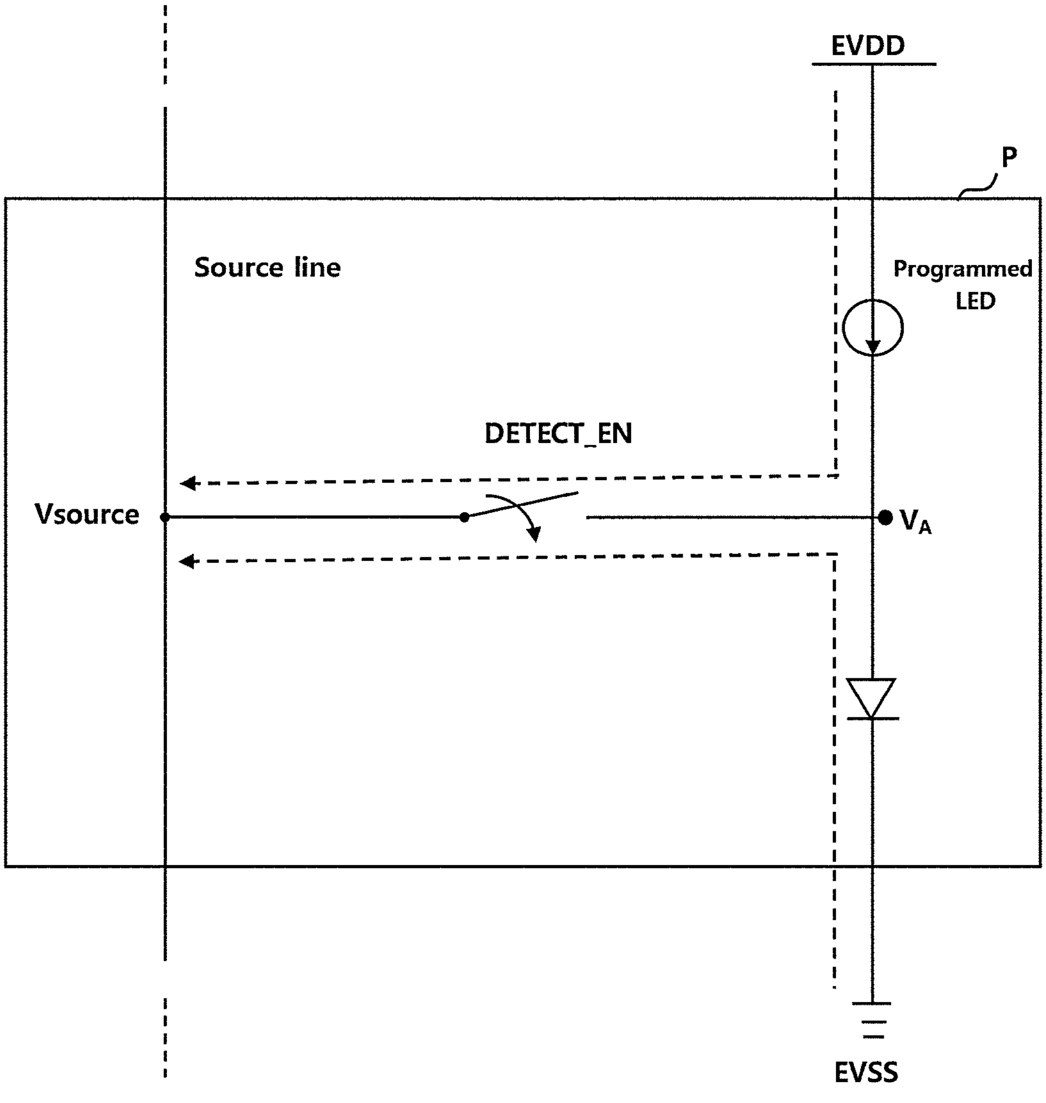
FIG. 7A is a diagram illustrating a circuit in a state where an LED is normal, in accordance with an embodiment.
Figure 7B:
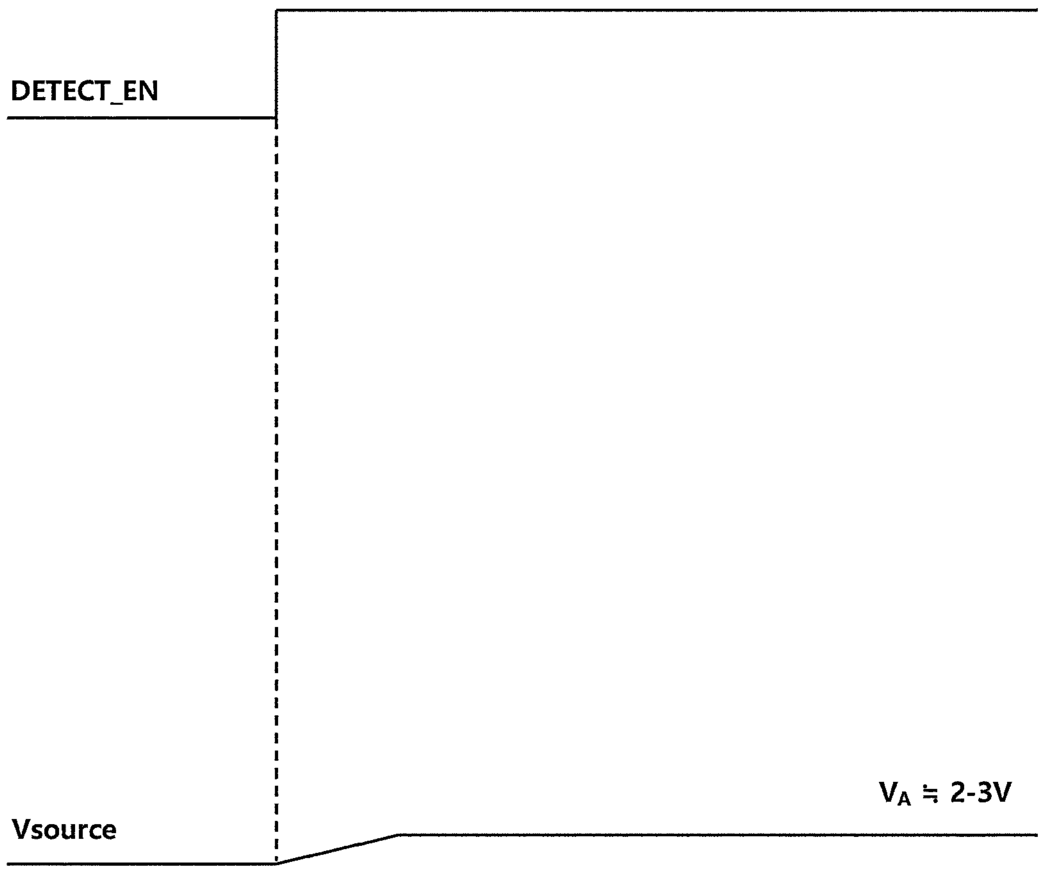
FIG. 7B is a diagram illustrating a forward voltage drop in a state where the LED is normal, in accordance with an embodiment.

Hereafter, a voltage sensed by the driving circuit 220 when the LED is normal or abnormal (e.g. open or shorted) will be described with reference to FIGS. 7A, 7B, 8A, 8B, 9A and 9B. FIGS. 7A and 7B illustrate an equivalent circuit when the LED is normal, and a sensing voltage (e.g. forward voltage drop) of the LED, FIGS. 8A and 8B illustrate an equivalent circuit when the LED is open, and a sensing voltage (e.g. forward voltage drop) of the LED, and FIGS. 9A and 9B illustrate an equivalent circuit when the LED is shorted, and a sensing voltage (e.g. forward voltage drop) of the LED.

Referring to FIGS. 7A and 7B, when the detection control signal is applied to the third transistor TR3 to turn on the third transistor T3 in case that the LED is normal, the voltage VSOURCE of the fifth node N5, sensed by the driving circuit 220 (e.g. amplifier 221), rises to a voltage value of 2 to 3 V from the initial voltage value. For example, the anode terminal of the LED may retain a voltage of 2 to 3 V according to a forward voltage, while the LED is normal.

Figure 8A:
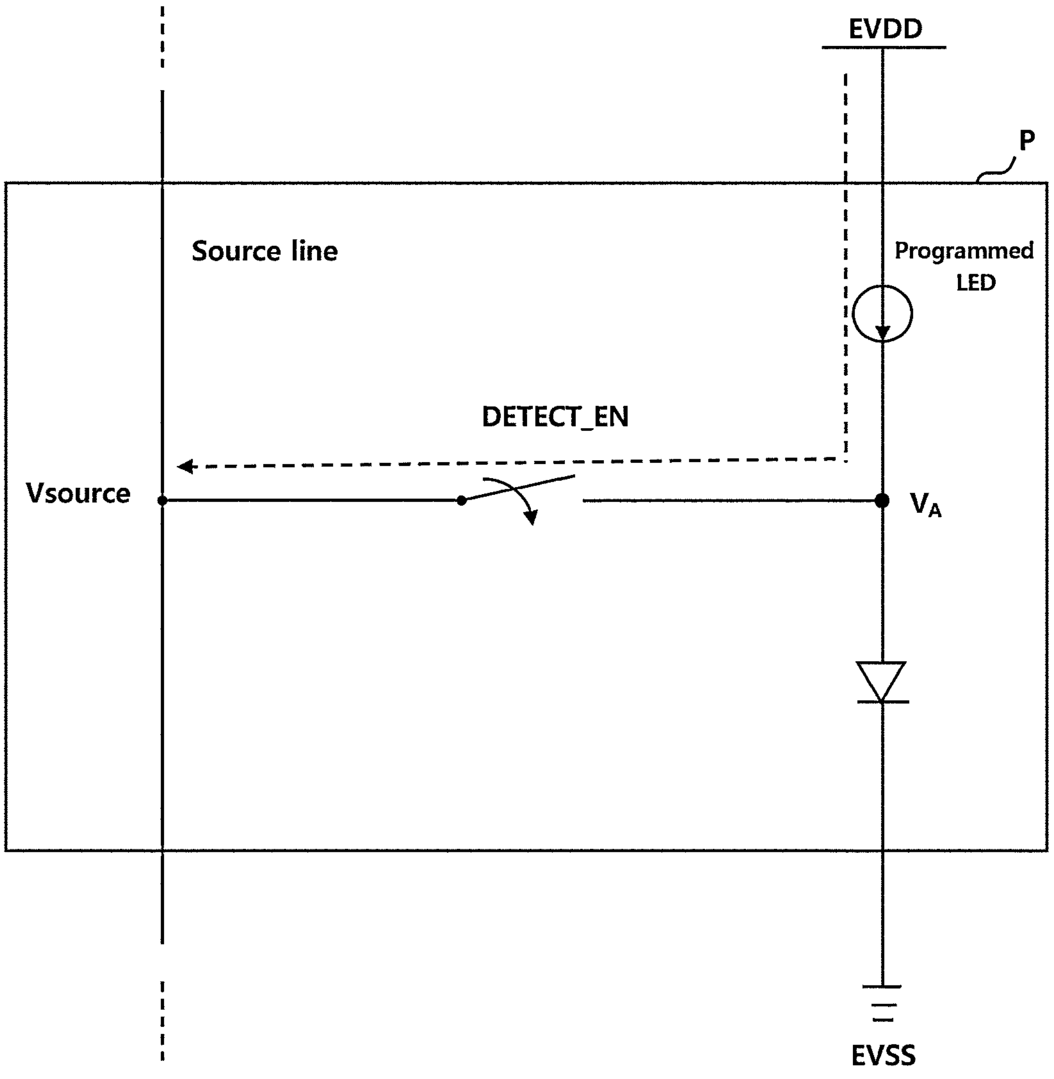
FIG. 8A is a diagram illustrating the circuit in a state where the LED is open, in accordance with an embodiment.
Figure 8B:
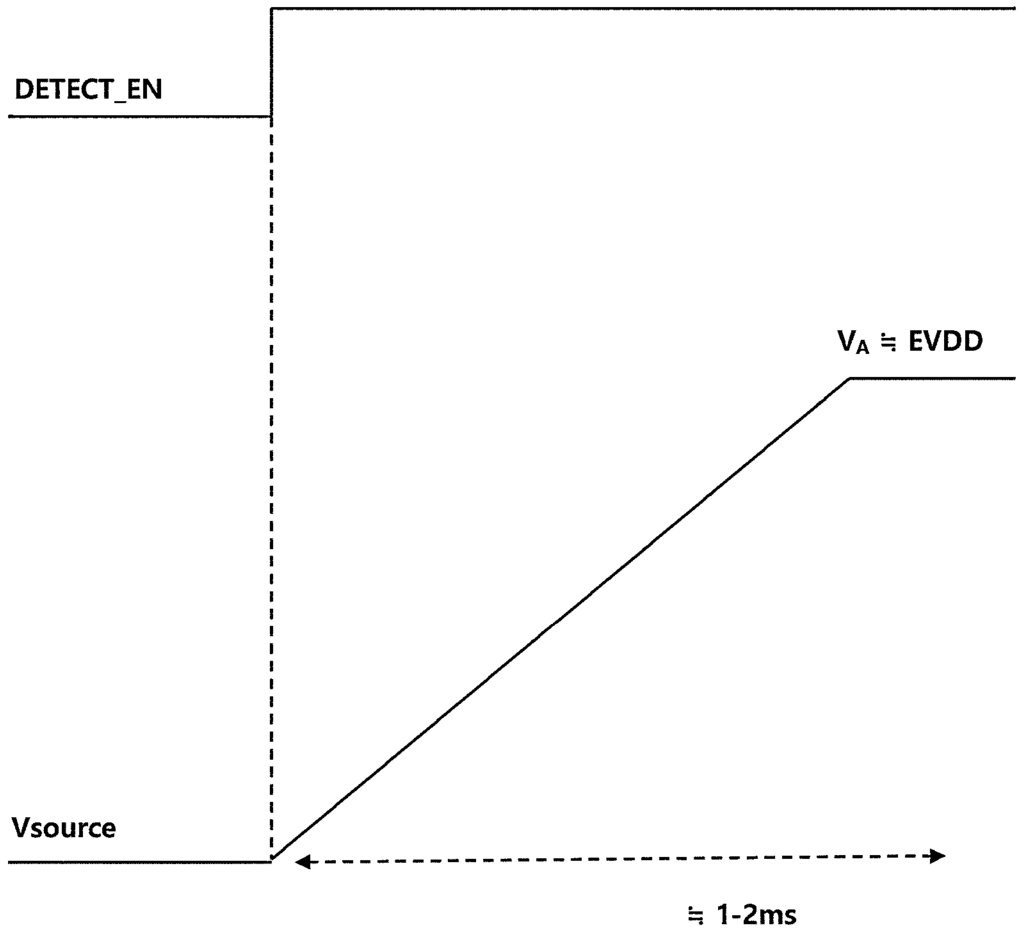
FIG. 8B is a diagram illustrating a forward voltage drop in a state where the LED is open, in accordance with an embodiment.

Referring to FIGS. 8A and 8B, when the detection control signal is applied to the third transistor TR3 to turn on the third transistor T3 in case that the LED is open so that a defect occurred, the voltage VSOURCE of the fifth node N5, sensed by the driving circuit 220 (e.g. amplifier 221), gradually rises and retains the driving voltage EVDD higher than the voltage (e.g. 2 to 3 V) in the normal state. For example, since the LED is open, no current flows through the LED. Thus, the driving voltage EVDD is applied to the sixth node N6 and the fifth node N5. In an embodiment, a voltage between the voltage (e.g. 2 to 3 V) in the normal state and the driving voltage EVDD may be set to the first reference voltage, and the first reference voltage may be compared to the voltage sensed through the fifth node N5, in order to determine whether the LED is open so that a defect occurred. For example, when the voltage sensed through the fifth node N5 is higher than the first reference voltage, the LED may be determined to be open.

Figure 9A:
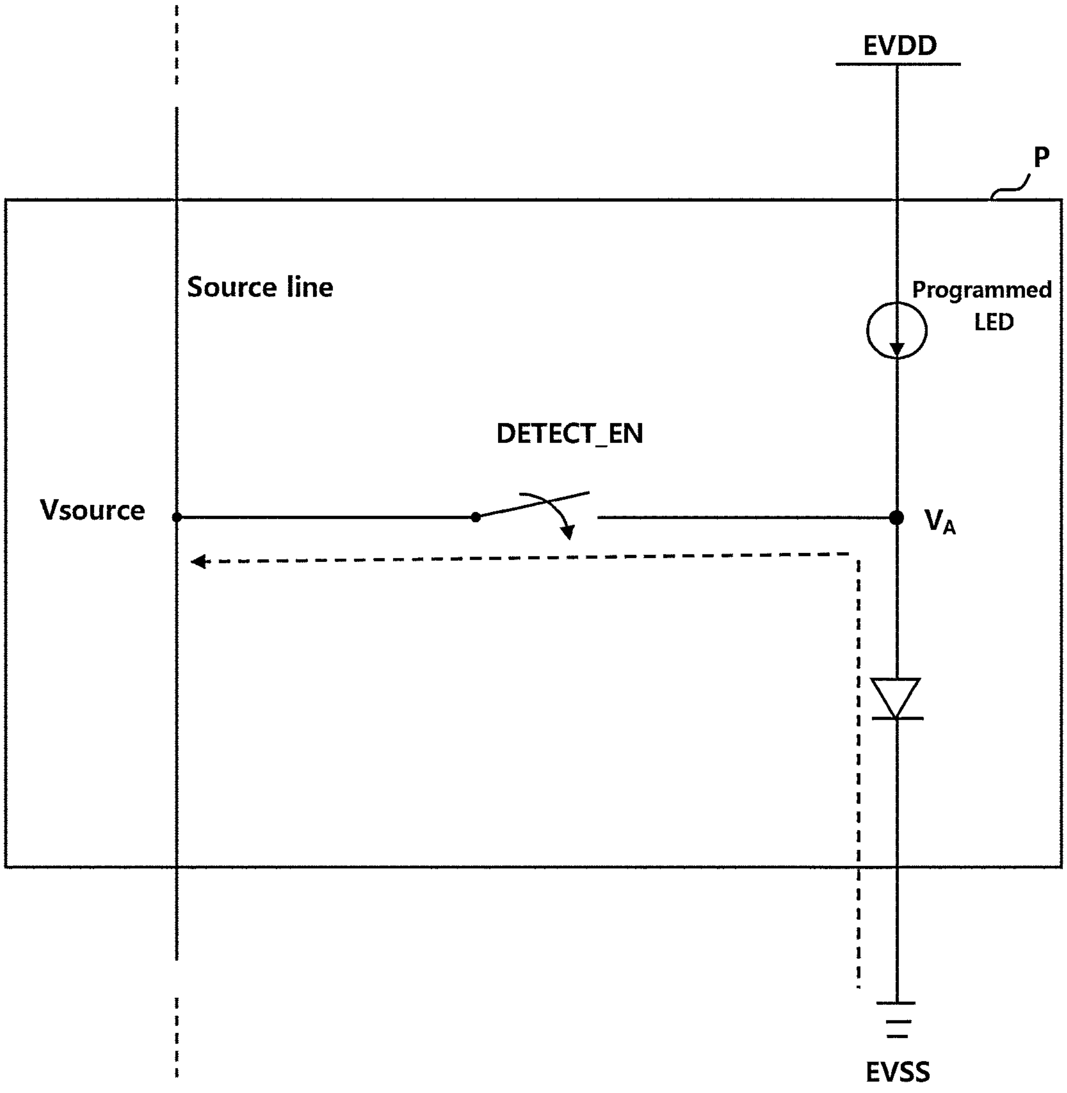
FIG. 9A is a diagram illustrating the circuit in a state where the LED is shorted, in accordance with an embodiment.
Figure 9B:
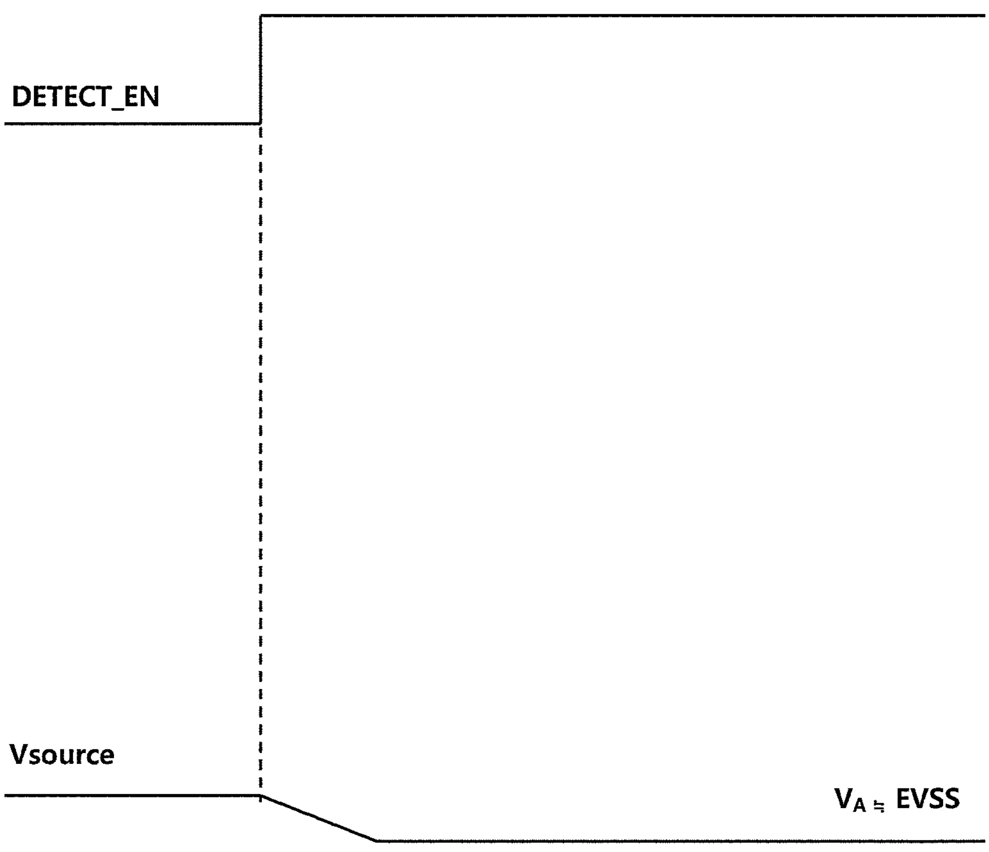
FIG. 9B is a diagram illustrating a forward voltage drop in a state where the LED is shorted, in accordance with an embodiment.

Referring to FIGS. 9A and 9B, when the detection control signal is applied to the third transistor TR3 to turn on the third transistor T3 in case that the LED is shorted so that a defect occurred, the voltage VSOURCE of the fifth node N5, sensed by the driving circuit 220 (e.g. amplifier 221), falls and retains the ground voltage EVSS or GND (e.g. 0 V) lower than the voltage (e.g. 2 to 3 V) in the normal state. For example, since the LED is shorted, the voltage of the fifth node N5 becomes equal to the ground voltage EVSS. In an embodiment, a voltage between the voltage (e.g. 2 to 3 V) in the normal state and the ground voltage EVSS may be set to the second reference voltage, and the second reference voltage may be compared to the voltage sensed through the fifth node N5, in order to determine whether the LED is shorted so that an error occurred. For example, when the voltage sensed through the fifth node N5 is lower than the second reference voltage, the LED may be determined to be shorted.

Figure 10:
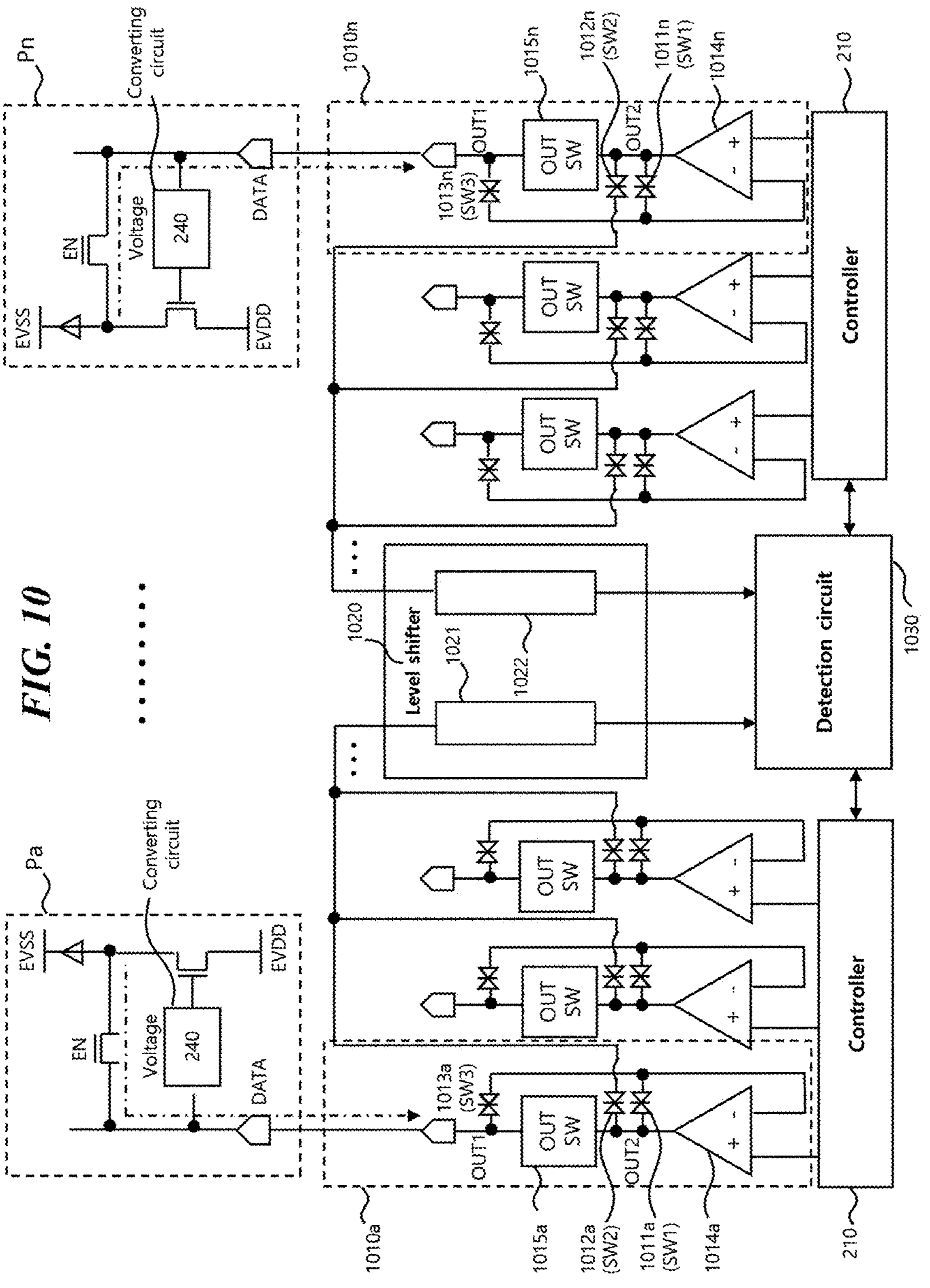
FIG. 10 is a detailed configuration diagram of a display device in accordance with an embodiment.

FIG. 10 is a detailed configuration diagram of a display device in accordance with an embodiment. Referring to FIG. 10, the display device may include a controller 210, a plurality of driving circuits 1010 (e.g. n driving circuits), a plurality of pixels P (e.g. n pixels), a level shifter 1020 and a detection circuit 1030. Each of the driving circuits 1010 may include an amplifier 1014, a first switch (SW1) 1011, a second switch (SW2) 1012, a third switch (SW3) 1013 and an output switch (OUT SW) 1015. For example, a first driving circuit 1010*a* for driving a first pixel P1 may include an amplifier 1014*a*, a first switch 1011*a*, a second switch 1012*a*, a third switch 1013*a* and an output switch 1015*a*, and an $n^{th}$ driving circuit 1010*n* for driving an $n^{th}$ pixel Pn may include an amplifier 1014*n*, a first switch 1011*n*, a second switch 1012*n*, a third switch 1013*n* and an output switch 1015*n*. For convenience of description, a line connected to the pixel P from the output switch 1015 may be referred to as a first output line OUT1, and a line connected between the amplifier 1014 and the output switch 1015 may be referred to as a second output line OUT2. In accordance with an embodiment, at least some driving circuits of the plurality of driving circuits 1010 may be connected to a first level shifter 1021 of the level shifter 1020, and the other driving circuits may be connected to a second level shifter 1022 of the level shifter 1020.

Figure 11:
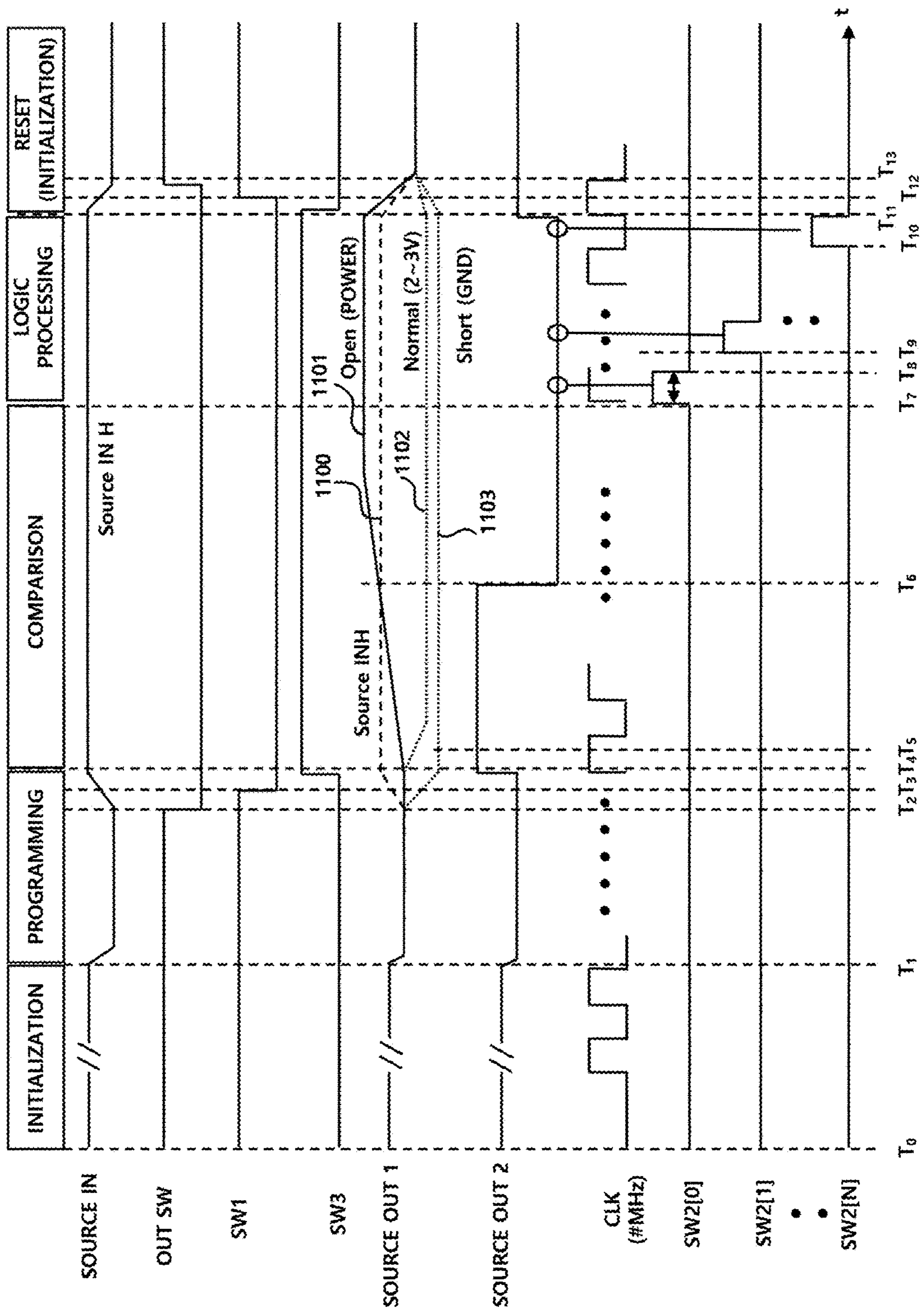
FIG. 11 is a timing diagram illustrating signals of the display device, which are used to determine whether the LED is open, in accordance with an embodiment.
Figure 12:
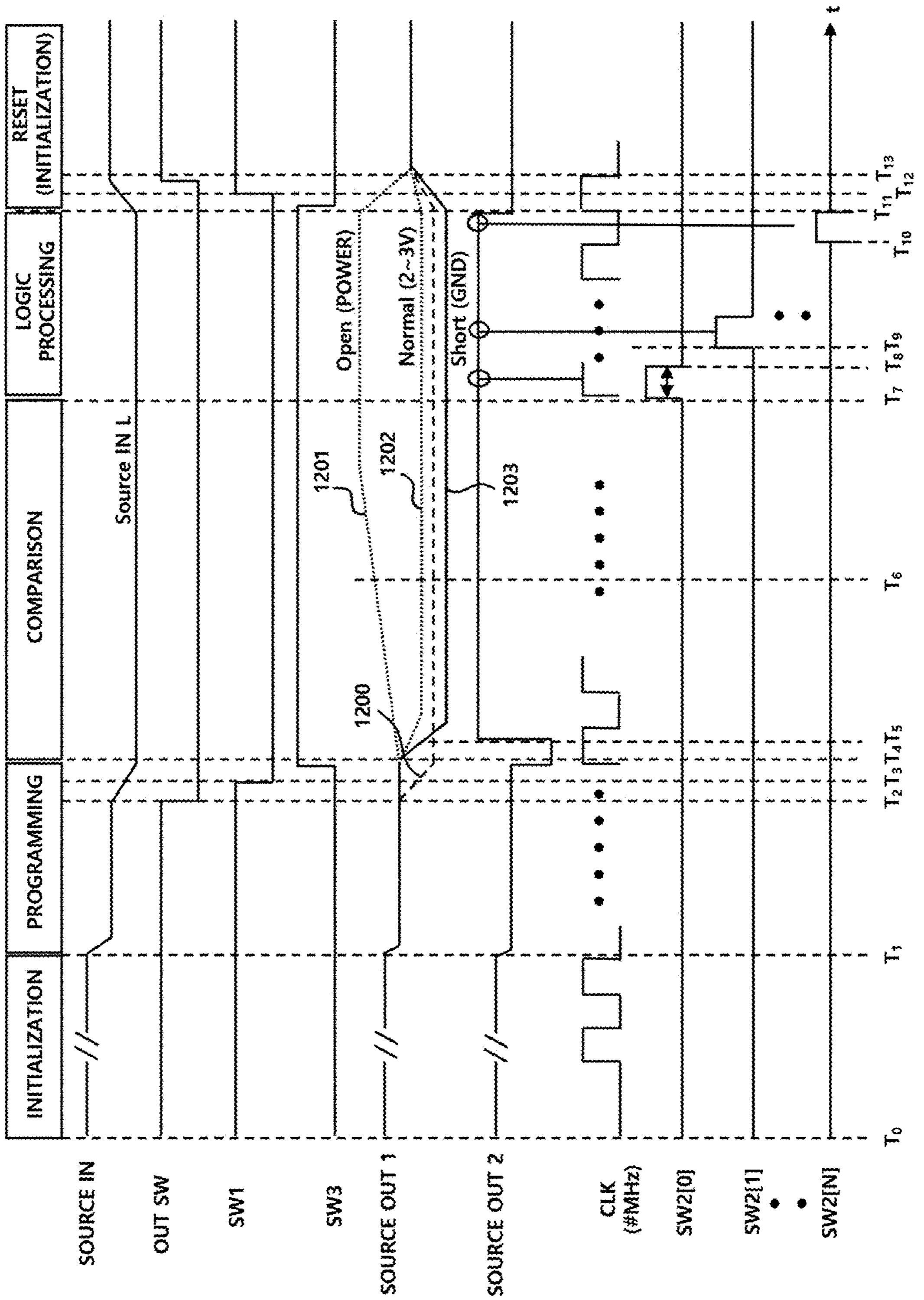
FIG. 12 is a timing diagram illustrating signals of the display device, which are used to determine whether the LED is shorted, in accordance with an embodiment.

Hereafter, an operation of the display device in the pixel defect detecting mode (e.g. second mode) in accordance with an embodiment will be described with reference to FIGS. 10 to 12. FIGS. 11 and 12 are timing diagrams of signals operated in the display device of FIG. 10, in accordance with an embodiment.

Referring to FIG. 11, a period from T0 to T1 may correspond to the initialization period, a period from T1 to T4 may correspond to the programming period, a period from T4 to T7 may correspond to the comparison period, a period from T7 to T11 may correspond to the logic processing period, and a period from T11 may correspond to the reset period (or initialization period). In each of the periods, a clock signal CLK may be supplied to the driving circuit 220 according to a preset cycle or frequency (e.g. several MHz). The controller 210 may open/close each of the switches included in the display device, and supply a control signal (e.g. gate control signal) to each of the pixels P, such that at least one transistor included in the pixel P is turned on or off.

In the initialization period from T0 to T1, the first switch (SW1) 1011 and the output switch (OUT SW) 1015 may be controlled to be closed, and the third switch 1013 may be controlled to be open. In the initialization period, a preset source voltage SOURCE IN may be inputted to the first input terminal of the amplifier 1014, and the output switch 1015 may be controlled to be closed. Thus, the source voltage may be applied to the first output line OUT1 and the second output line OUT2.

The controller 210 may control the driving circuit to switch from the initialization period to the programming period at T1. For example, the controller 210 may close the first switch 1011 and the output switch 1015 at T1. In the programming period, a test voltage for pixel defect detection may be inputted to the first input terminal (e.g. positive (+) terminal) of the amplifier 1014. The amplifier 1014 may operate as an output buffer in the programming period, and a current corresponding to the test voltage inputted to the first input terminal of the amplifier 1014 may be supplied to the converting circuit 240 of each pixel P through the output terminal of the amplifier 1014. In the programming period, the transistor (e.g. fourth transistor TR4) within the converting circuit 240 may be turned on, and the current inputted to the converting circuit 240 may be stored in the capacitor (e.g. storage capacitor Cstg) within the converting circuit 240.

The controller 210 may control the driving circuit to switch from the programming period to the comparison period at T4. The controller 210 may open the output switch 1015 at T2 before the programming period is switched to the comparison period at T4, and open the first switch 1011 at T3. When the programming period of the driving circuit is switched to the comparison period at T4, the controller 210 closes the third switch 1013.

In order to determine whether the LED is open, the controller 210 may supply a first reference voltage (SOURCE IN H) 1100 to the first input terminal. For example, when the LED is open, the voltage of the LED, sensed by the driving circuit 1010, may correspond to the driving voltage EVDD. Therefore, a voltage between the voltage (e.g. 2 to 3 V) in the normal state and the driving voltage EVDD may be set to the first reference voltage. When the LED is open in the comparison period, a voltage (SOURCE OUT1) 1101 of the first output line OUT1 may gradually rise and correspond to the driving voltage EVDD as illustrated in FIG. 11. When the LED is normal in the comparison period, a voltage (SOURCE OUT1) 1102 of the first output line OUT1 may be retained at a voltage of 2 to 3 V as illustrated in FIG. 11. When the LED is shorted in the comparison period, a voltage (SOURCE OUT1) 1103 of the first output line OUT1 may fall and correspond to the ground voltage EVSS or GND (e.g. 0 V) as illustrated in FIG. 11.

When the LED is open in the comparison period, the voltage 1101 of the first output line OUT1 gradually rises as illustrated in FIG. 11, and becomes higher than the first reference voltage (SOURCE IN H) 1100 at T6. The amplifier 1014 may operate as a comparator in the comparison period. As the third switch 1013 is controlled to be closed in the comparison period, a voltage sensed for the LED may be inputted to a second input terminal (e.g. negative (−) terminal) of the amplifier 1014 through a feedback line. For example, the voltage of the second output line OUT2 corresponds to a result obtained by comparing the first reference voltage 1100 inputted to the first input terminal to the voltage 1101 of the first output line OUT1 inputted to the second input terminal, through the amplifier 1014. Therefore, the voltage of the second output line OUT2 may become a high signal in the period from T4 to T6, and become a low signal in the period from T6 to T11.

The controller 210 may switch the comparison period to the logic processing period at T7. For example, the controller 210 may sequentially close the second switches 1012 of the plurality of pixels at T7, such that the signals of the second output lines OUT2, which are the comparison results of the amplifiers 1014 in the respective pixels, are transmitted to the level shifter 1020 and the detection circuit 1030. The level shifter 1020 may include the first level shifter 1021 and the second level shifter 1022. The level shifter 1020 may convert the level of an input signal into a voltage level which can be processed by the detection circuit 1030, for example, a voltage level corresponding to a digital signal. In an embodiment, the plurality of pixels included in the display panel may be sorted into first group pixels and second group pixels, the voltage levels of the first group pixels may be converted by the first level shifter 1021, and the voltage levels of the second group pixels may be converted by the second level shifter 1022. The signals converted by the level shifter 1020 may be inputted to the detection circuit 1030. The detection circuit 1030 may check a result received from each of the pixels at the timing that the second switch 1012 is closed, for example, the signal of the second output line OUT2. When the signal of the second output line OUT2 for a specific pixel is a low signal, the detection circuit 1030 may determine that the corresponding pixel is open, thereby checking a defect. As illustrated in FIG. 11, the controller 210 may sequentially close the second switches 1012 of a plurality of pixels P (e.g. a plurality of pixels arranged in the same row among the plurality of pixels arranged in the panel) within one first mode operation period (e.g. the comparison period and the logic processing period), and thus sense voltages of the plurality of LEDs included in the respective pixels (for example, a voltage applied to an anode terminal of a light emitting diode, such as a forward drop voltage) at the same time. For example, the plurality of driving circuits 1010 may sequentially transmit the comparison results with the first reference voltage for the plurality of LEDs to the level shifter 1020 and the detection circuit 1030 within one first mode operation period.

Referring to FIG. 12, a period from T0 to T1 may correspond to an initialization period, a period from T1 to T4 may correspond to a programming period, a period from T4 to T7 may correspond to a comparison period, a period from T7 to T11 may correspond to a logic processing period, and a period from T11 may correspond to a reset period (or initialization period). In each of the periods, a clock signal CLK may be supplied to the driving circuit 220 according to a preset cycle or frequency (e.g. several MHz). The controller 210 may open/close each of the switches included in the display device, and supply a control signal (e.g. gate control signal) to each of the pixels P, such that at least one transistor included in the pixel P is turned on or off.

In the initialization period from T0 to T1, the first switch (SW1) 1011 and the output switch (OUT SW) 1015 may be controlled to be closed, and the third switch (SW3) 1013 may be controlled to be open. As a preset source voltage SOURCE IN is inputted to the first input terminal of the amplifier 1014 and the output switch 1015 is controlled to be closed, the source voltage may be applied to the first output line OUT1 and the second output line OUT2.

The controller 210 may control the driving circuit to switch from the initialization period to the programming period at T1. For example, the controller 210 may close the first switch 1011 and the output switch 1015 at T1. In the programming period, a test voltage for pixel defect detection may be inputted to the first input terminal (e.g. positive (+) terminal) of the amplifier 1014. The amplifier 1014 may operate as an output buffer in the programming period, and a current corresponding to the test voltage inputted to the first input terminal of the amplifier 1014 may be supplied to the converting circuit 240 of each pixel P through the output terminal of the amplifier 1014. In the programming period, the transistor (e.g. fourth transistor TR4) within the converting circuit 240 may be turned on, and the current inputted to the converting circuit 240 may be stored in the capacitor (e.g. storage capacitor Cstg) within the converting circuit 240.

The controller 210 may control the driving circuit to switch from the programming period to the comparison period at T4. The controller 210 may open the output switch 1015 at T2 before the programming period is switched to the comparison period at T4, and open the first switch 1011 at T3. When the programming period is switched to the comparison period at T4, the controller 210 closes the third switch 1013.

In order to determine whether the LED is shorted, the controller 210 may supply a second reference voltage (SOURCE IN L) 1200 to the first input terminal. For example, when the LED is shorted, the voltage of the LED, sensed by the driving circuit 1010, may correspond to the ground voltage EVSS. Therefore, a voltage between the voltage (e.g. 2 to 3 V) in the normal state and the ground voltage EVSS may be set to the second reference voltage. When the LED is shorted in the comparison period, a voltage 1201 of the first output line OUT1 may fall and correspond to the ground voltage EVSS or GND (e.g. 0 V)

as illustrated in FIG. 12. When the LED is normal in the comparison period, a voltage (SOURCE OUT 1) 1202 of the first output line OUT1 may be retained at a value of 2 to 3 V as illustrated in FIG. 12. When the LED is open in the comparison period, the voltage 1201 of the first output line OUT1 may gradually rise and correspond to the driving voltage EVDD as illustrated in FIG. 12.

When the LED is shorted in the comparison period, a voltage 1203 of the first output line OUT1 falls as illustrated in FIG. 12, and becomes lower than the second reference voltage (SOURCE IN L) 1200 at time T5. The amplifier 1014 may operate as a comparator in the comparison period. As the third switch 1013 is controlled to be closed in the comparison period, a voltage sensed for the LED may be inputted to the second input terminal (e.g. negative (−) terminal) of the amplifier 1014 through a feedback line. For example, the voltage of the second output line OUT2 corresponds to a result obtained by comparing the second reference voltage 1200 inputted to the first input terminal to the voltage 1201 of the first output line OUT1 inputted to the second input terminal, through the amplifier 1014. Therefore, the voltage of the second output line OUT2 may become a high signal in the period from T5 to T11.

The controller 210 may control the driving circuit to operate in the logic processing period at T7. For example, the controller 210 may sequentially close the second switches 1012 of a plurality of pixels (e.g. a plurality of pixels arranged in the same row among the plurality of pixels arranged in the panel) at T7, such that the signals of the second output lines OUT2, which are the comparison results of the amplifiers 1014 in the respective pixels, are transmitted to the level shifter 1020 and the detection circuit 1030. The detection circuit 1030 may check a result received from each of the pixels at the timing that the second switch 1012 is closed, for example, the signal of the second output line OUT2. When the signal of the second output line OUT2 for a specific pixel is a high signal, the detection circuit 1030 may determine that the corresponding pixel is shorted, thereby checking a defect.

Table 2 below shows the signals of the second output line OUT2 in the normal state, the open state and the shorted state when the input signal is at the first reference voltage SOURCE IN H as described with reference to FIG. 11, and the signals of the second output line OUT2 in the normal state, the open state and the shorted state when the input signal is at the second reference voltage SOURCE IN L as described with reference to FIG. 12.

TABLE 2

| Comparison voltage | Normal | Open | Short |
|---|---|---|---|
| First reference voltage (SOURCE IN H) | High | Low | High |
| Second reference voltage (SOURCE IN L) | Low | Low | High |

Referring to Table 2, an open LED may be detected by the first reference voltage, and a shorted LED may be detected by the second reference voltage. In an embodiment, the display device may simultaneously check whether a plurality of pixels (e.g. a plurality of pixels arranged in the same row among the plurality of pixels arranged in the panel) are open, during one pixel defect detecting mode period as illustrated in FIG. 11, and simultaneously check whether a plurality of pixels (e.g. a plurality of pixels arranged in the same row among the plurality of pixels arranged in the panel) are shorted, during one pixel defect detecting mode period as illustrated in FIG. 12. For example, the display device may simultaneously check whether a plurality of pixels (e.g. a plurality of pixels arranged in the same row among the plurality of pixels arranged in the panel) are normal, open or shorted, through the two comparison periods. In the above-described embodiments, the case in which the display panel operates in the first mode and the second mode has been taken as an example. However, the display panel may operate to perform the functions by the second mode.

What is claimed is:

1. An integrated circuit comprising:

a driving circuit configured to provide a data voltage to a pixel through a data line connected with the pixel of a panel, to sense a voltage of a light emitting diode of the pixel through the data line, and to compare the voltage of the light emitting diode with a reference voltage; and a detection circuit configured to receive, from the driving circuit, the comparison result between the voltage of the light emitting diode and at least one reference voltage and to determine a defect of the pixel on the basis of the received comparison result, wherein the driving circuit includes a first driving circuit and a second driving circuit comprising an amplifier, a first switch connected to an output terminal of the amplifier and a second switch connected with the detection circuit at the output terminal of the amplifier, respectively, and wherein the second switch of the first driving circuit and the second switch of the second driving circuit are connected to each other and to the detection circuit.

2. The integrated circuit of claim 1, wherein while the first switch is closed, the amplifier receives a source voltage through a first input terminal thereof, and provides the data voltage to the pixel through the data line connected to the output terminal thereof, and wherein while the first switch is open, the amplifier receives the reference voltage through the first input terminal thereof, receives the voltage of the light emitting diode sensed through the data line, through a second input terminal thereof, and outputs, to the output terminal, the comparison result between the reference voltage and the voltage of the light emitting diode.

3. The integrated circuit of claim 2, wherein, while the second switch is closed, the comparison result between the reference voltage and the voltage of the light emitting diode, outputted from the output terminal of the amplifier, is transmitted to the detection circuit through the second switch.

4. The integrated circuit of claim 2, wherein the driving circuit comprises a feedback line which diverges from between the first switch and the pixel and is connected to the second input terminal of the amplifier, and wherein the voltage of the light emitting diode, which is sensed through the data line, is inputted to the second input terminal through the feedback line.

5. The integrated circuit of claim 4, wherein the driving circuit comprises a third switch connected to the feedback line, and wherein while the first switch is open, the third switch is controlled to be closed.

6. The integrated circuit of claim 1, wherein the reference voltage comprises a first reference voltage, and wherein, when the received comparison result indicates that the voltage of the light emitting diode is higher than the first reference voltage, the detection circuit determines that the light emitting diode is in an open state.

7. The integrated circuit of claim 1, wherein the reference voltage comprises a second reference voltage, and wherein, when the comparison result indicates that the voltage of the light emitting diode is lower than the second reference voltage, the detection circuit determines that the light emitting diode is in a shorted state.

8. The integrated circuit of claim 1, wherein the voltage of the light emitting diode is a forward voltage drop of the light emitting diode, measured at an anode terminal of the light emitting diode.

9. The integrated circuit of claim 1, wherein the driving circuit simultaneously senses voltages of a plurality of light emitting diodes included in a plurality of pixels arranged in the same row, among a plurality of pixels arranged in the panel.

10. The integrated circuit of claim 9, wherein the driving circuit sequentially transmits, to the detection circuit, the comparison results with the reference voltage for the plurality of light emitting diodes.

11. The integrated circuit of claim 1, wherein the detection circuit is configured to sequentially receive, from the first driving circuit and the second driving circuit, i) a first comparison result between a voltage of a light emitting diode of a first pixel and at least one reference voltage and ii) a second comparison result between a voltage of a light emitting diode of a second pixel and at least one reference voltage, and the sequential receiving of the first comparison result and the second comparison result at the detection circuit is performed by turning on the second switch of the first driving circuit and the second switch of the second driving circuit sequentially.

12. A pixel driving device comprising:

an amplifier configured to provide a data voltage to a pixel through a data line connected with the pixel of a panel; and a first switch connected between the pixel and an output terminal of the amplifier, and a second switch connected to a detection circuit at the output terminal of the amplifier, wherein, while the first switch is closed, the amplifier receives a source voltage through a first input terminal thereof and provides the data voltage to the pixel through the data line connected to an output terminal thereof, wherein, while the first switch is open, the amplifier receives a reference voltage through the first input terminal thereof, receives the voltage of the light emitting diode included in the pixel sensed through the data line, through a second input terminal thereof, and outputs, to the output terminal, a comparison result between the reference voltage and the voltage of the light emitting diode, wherein, while the second switch is closed, the comparison result between the reference voltage and the voltage of the light emitting diode, outputted from the output terminal of the amplifier, is transmitted to the detection circuit through the second switch, wherein the pixel driving device includes a first driving circuit and a second driving circuit comprising the amplifier, the first switch and the second switch, respectively, and wherein the second switch of the first driving circuit and the second switch of the second driving circuit are connected to each other and to the detection circuit.

13. The pixel driving device of claim 12, wherein the pixel driving device comprises a feedback line which diverges from between the first switch and the pixel and is connected to the second input terminal of the amplifier, and wherein the voltage of the light emitting diode, which is sensed through the data line, is inputted to the second input terminal through the feedback line.

14. The pixel driving device of claim 13, wherein the pixel driving device comprises a third switch connected to the feedback line, and wherein, while the first switch is open, the third switch is controlled to be closed.

15. The pixel driving device of claim 12, wherein a first reference voltage is inputted to the first input terminal of the amplifier, in order to determine whether the light emitting diode is in an open state.

16. The pixel driving device of claim 12, wherein a second reference voltage is inputted to the first input terminal of the amplifier, in order to determine whether the light emitting diode is in a shorted state.

17. The pixel driving device of claim 12, wherein the voltage of the light emitting diode is a forward voltage drop of the light emitting diode, measured at an anode terminal of the light emitting diode.

18. A pixel defect detecting method comprising:

providing a data voltage to a pixel through an amplifier connected through a data line with the pixel of a display panel in a first time period;

receiving, by the amplifier, a reference voltage and a voltage of a light emitting diode included in the pixel and outputting a comparison result between the reference voltage and the voltage of the light emitting diode in a second time period; and identifying a defect of the pixel on the basis of the comparison result between the reference voltage and the voltage of the light emitting diode, wherein a pixel driving device for detecting the pixel defect includes a first driving circuit and a second driving circuit comprising the amplifier, a first switch connected between the pixel and an output terminal of the amplifier, and a second switch connected to a detection circuit at the output terminal of the amplifier, respectively, and wherein the second switch of the first driving circuit and the second switch of the second driving circuit are connected to each other and to a detection circuit.

19. The pixel defect detecting method of claim 18, further comprising:

determining whether the light emitting diode is in an open state on the basis of a comparison result between a first reference voltage and the voltage of the light emitting diode; and determining whether the light emitting diode is in a shorted state on the basis of a comparison result between a second reference voltage and the voltage of the light emitting diode.

* * * * *